United States Patent
Watanabe et al.

(10) Patent No.: US 6,860,539 B2
(45) Date of Patent: Mar. 1, 2005

(54) TWO-COLOR MOLDING AND MOLDING METHOD THEREOF

(75) Inventors: Nobuhiro Watanabe, Ichihara (JP); Tomomi Hasegawa, Ichihara (JP); Akio Ishiguchi, Aichi (JP)

(73) Assignees: Idemitsu Petrochemical Co., Ltd., Tokyo (JP); Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 10/425,958

(22) Filed: Apr. 30, 2003

(65) Prior Publication Data

US 2004/0036315 A1 Feb. 26, 2004

(30) Foreign Application Priority Data

May 1, 2002 (JP) ......................................... 2002-129845

(51) Int. Cl.[7] .................................................. B60J 10/02
(52) U.S. Cl. ............... 296/93; 296/901.01; 296/146.15; 52/716.5; 52/717.05; 52/208
(58) Field of Search ............................... 296/93, 901.1, 296/146.15; 52/716.5, 208, 717.05; 428/45, 46, 412

(56) References Cited

U.S. PATENT DOCUMENTS

| | | | | |
|---|---|---|---|---|
| 6,349,987 B1 | * | 2/2002 | Boulbon | 296/39.3 |
| 6,382,696 B1 | * | 5/2002 | Young | 296/93 |
| RE37,737 E | * | 6/2002 | Yada | 296/93 |
| 6,513,854 B2 | * | 2/2003 | Lagrue et al. | 296/93 |

* cited by examiner

*Primary Examiner*—Stephen Gordon
(74) *Attorney, Agent, or Firm*—Oblon, Spivak, McClelland, Maier & Neustadt, P.C.

(57) ABSTRACT

A window 30 is a two-color molding comprising a transparent section 32 and a frame section 31 integrated with the transparent section 32, the frame section 31 and the transparent section 32 are formed with a first material and a second material respectively, and the first material is a thermoplastic resin with the linear thermal expansion coefficient in the MD direction lower by $1 \times 10^{-5}$ to $3 \times 10^{-5}$ (mm/(mm.K)) than that of the second material, and also with the MD/TD ratio for the linear thermal expansion coefficient in the range from 0.6 to 1.

8 Claims, 2 Drawing Sheets

TWO-COLOR MOLDING AND MOLDING METHOD THEREOF

BACKGROUND OF THE INVENTION

1. Field of the Invention

The present invention relates to a two-color molding comprising a transparent section and a frame section integrated with the transparent section and to a molding method for the same, and is applicable to vehicles or industrial equipments requiring visibility for safety or for insuring the operability. The two-color molding according to the present invention is applicable to a rear quarter window, a front quarter window, and a rear window of a vehicle, a window at a lower section of an assistant driver's seat of a truck, a ceiling window for a heavy industrial machine, or the like.

2. Description of Related Art

Recently, in response to the more strengthened awareness of the necessity of environmental protection, standards for a quantity of exhaust gas from a vehicle or for components thereof have been introduced in many cities in many countries such as the exhaust standard in California in USA.

To satisfy the newly introduced standards as described above, car manufacturers have concentrated their efforts in development of an internal combustion engine which can be used in a super fuel-efficient car, a hybrid car, an electric car, a fuel-cell car, the electronic control technology for enabling fast combustion of fuel, the catalyst technology for capturing harmful emission in a muffler with a catalyst, or the like, and in addition to developing such technologies, the car manufacturers are trying to reduce car weight for improving the fuel efficiency by reducing a load on the internal combustion engine.

For the purpose to reduce car weight, it is generally tried to produce relatively large parts of a car such as a bumper, a fender, a sunroof with resin. Of these, the transparent members such as a sunroof are disclosed in Japanese Patent Laid-Open Publication No. HEI 9-123769.

In Japanese Patent Laid-Open Publication No. HEI 9-123769, as linear expansion coefficients of a transparent section, a frame section surrounding the transparent section, and a car body to which the frame section is attached are different from each other, a buffering member is provided between the frame section and the transparent section.

In the configuration as described above, however, as the transparent section and the frame section are produced separately, the assembly step is complicated, which may result in disadvantageous cost increase.

Further substantial deformation repeatedly occurs in the mall portion due to temperature change, which may cause a crack.

SUMMARY OF THE INVENTION

A main object of the present invention is to provide a low cost and high quality two-color molding comprising a transparent section and a frame section, and a molding method for molding the same.

The present applicant made concentrated efforts for solving the problem of deformation of the transparent portion due to the temperature change paying main attentions to the difference in linear thermal expansion coefficients between materials for the transparent section and the frame section as well as to the anisotropy of the material constituting the frame section, and made this invention based on a result of the efforts.

The two-color molding according to the present invention comprising a transparent section and a frame section integrated with the transparent section, wherein the frame section and the transparent section are formed with a first material and a second material respectively, and the first material is a thermoplastic resin with the linear thermal expansion coefficient in the MD direction lower by $1 \times 10^{-5}$ to $3 \times 10^{-5}$ (mm/(mm.K)) than that of the second material, and also with the MD/TD ratio of the linear thermal expansion coefficient in the range from 0.6 to 1.

The term MD direction is used herein to mean the direction viewed from the gate in which the thermoplastic resin flows, while the term TD direction is used to mean the direction crossing the thermoplastic resin.

As the second material for forming the transparent section therewith, a non-crystalline thermoplastic resin such as polystyrene, polyacrylonitrile, polymethylmethacrylate, and polyacrylate is preferable, and polycarbonate having the high shock resistance and transparency is especially preferable.

When polycarbonate is used as the second material, a polymer blend material containing polycarbonate is preferably used as the first material to improve the adhesiveness to the polycarbonate, and further the first material should preferably include an inorganic filler to make the linear thermal expansion coefficient lower than that of the second material.

Thus, the first material may comprise polycarbonate in the range from 40 to 90% by weight, a polyester resin and/or a styrene-based rubber-like elastic copolymer resin in the range from 10 to 60% by weight, an inorganic filler in the range from 5 to 20% by weight, and a core-shell type graft rubber-like elastic body in the range from 0 to 20% by weight, 100% by weight in all, while the second material may be polycarbonate.

Alternatively, the first material may comprise polycarbonate in the range from 50 to 90% by weight, a polyester-based resin in the range from 10 to 40% by weight, an inorganic filler in the range from 5 to 20% by weight, and core-shell type graft rubber-like elastic body in the range from 0 to 20% by weight, 100% by weight in all, while the second material may be polycarbonate.

Further the first material may comprise polycarbonate in the range from 40 to 90% by weight, a styrene-based rubber-like elastic copolymer resin in the range from 10 to 60% by weight, an inorganic filler in the range from 5 to 20% by weight, and a core-shell type graft rubber-like elastic body in the range from 0 to 20% by weight, 100% by weight in all, while the second material may be polycarbonate.

The inorganic filler may be talc.

The inorganic filler may also be glass fiber, which is included by 5 to 15% by weight in the first material.

The following materials may be used as those for molding in the present invention.

(A) Polycarbonate (PC)

There is no specific restriction over the polycarbonate used in this invention and any type of polycarbonate may be used, the aromatic polycarbonate produced from bivalent phenol and a carbonate precursor by means of the solution technique or the melting method is preferable. Namely the polycarbonate produced through a reaction between the bivalent phenol and phosgene or through the ester exchange reaction between the bivalent phenol and diphenyl carbonate or the like is preferable.

The bivalent phenols include, but not limited to, 2,2-bis (4hydroxyphenyl) propane [bisphenol A], bis(4- hydroxyphenyl) methane, 1,1-bis(4-hydoxyphenyl) ethane, 2,2-bis(4hydroxy-3,5-dimethylphenyl) propane, 4,4'-dihydroxydiphenyl, bis(4hydroxyphenyl) cycloalkane, bis(4-hydroxyphenyl) oxide, bis(4-hydroxyphenyl) sulfide, bis(4-hydroxyphenyl) sulfone, bis(4hydroxyphenyl) sulfoxide, bis(4-hydroxyphenil) sulfoxide, bis(4-hydroxyphenyl) ether, bis(4-hydroxyphenyl) ketone.

The bivalent phenol preferably contains the bis(hydroxyphenyl) alkane, especially the bisphenol A as the main ingredient.

The bivalent phenols which may be used in the present invention include, in addition to those described above, hydroquinone, resorcin, and catechol. The bivalent phenol may be used singly or in combination of other one or more types of bivalent phenols.

The carbonate precursors include carbonyl halide, carbonyl ester, and haloformate, and more specifically phosgene dihaloformate, diphenyl carbonate, dimethyl carbonate, diethyl carbonate of bivalent phenol or the like.

The polycarbonate may have a branched structure, and the branching agents which can be used for this purpose include 1,1,1-tris(4-hydroxyphenyl) ethane, a,a',a"-tris(4-hydroxyphenyl)-1,3,5-triisopropylbenzene, fluoroglycin, trimellitic acid, isatin bis(o-cresol). In addition, to regulate the molecular weight, compounds as expressed by the following chemical formula such as phenol, p-t-butyl phenol, p-t-octyl phenol, and p-cumylphenol are used,

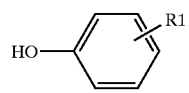
(1)

and each of these compounds may be used singly or in combination with one or more other ones. In the chemical formula above, R1 indicates an alkyl group having 8 to 40 carbon atoms.

The polycarbonate may be a copolymer having a polycarbonate portion and a polyorganosiloxane portion, or a polycarbonate resin containing the copolymer. Further the polyester-polycarbonate obtained by polymerizing polycarbonates in the presence of an ester precursor such as a bifunctional carboxylic acid such as telephthalic acid, or an ester-forming derivative thereof may be used for this purpose. Further mixtures of various types of polycarbonates may be used.

The viscosity-average molecular weight (Mv) of the polycarbonate is, in view of the mechanical strength and the moldability, in the range from 10,000 to 100,000, preferably in the range from 12,000 to 30,000, and more preferably in the range from 15,000 to 22,000. This viscosity-average molecular weight (Mv) is calculated by measuring the viscosity of the methylene chloride solution at 20° C. with an Ubbelohde viscosity meter to obtain the ultimate viscosity (η) and then applying the following equation (2):

$$[\eta] = 1.23 \times 10^{-5} \, Mv^{0.83} \tag{2}$$

If necessary, such materials as other thermoplastic resins, an elastomer, or an inorganic filler may be blended in the polycarbonate used in the first material according to the present invention to further improve the moldability, shock resistance, durability, and chemical resistance.

The other thermoplastic resins which can be used for the purpose described above include a resin having the compatibility with or dispersibility in the polycarbonate. The other thermoplastic resins include, for instance, a polyester resin such as polyethylene telephthalate, polybutylene telephthalate, a polystyrene resin, a rubber-denatured polystyrene resin, a polystyrene-based resin such as a polystyrene resin having the syndiotactic structure, a polyphenylene ether resin, a polyphenylene sulfide resin, polymethaacrylate resin, polyethylene, polypropylene, polybutene, and a polyolefin resin such as a copolymer of any of the compounds described above.

The polystyrene-based resins which can be used for the purpose described above include a monomer comprising a monovinyl-based aromatic monomer such as styrene and α-methyl styrene in the range from 20 to 100% by weight; a cyanated vinyl-based monomer such as acrylonitrile and methacrylonitrile in the range from 0 to 60% by weight; and other vinyl-based monomer such as maleimide or (metha) acrylic acid methyl in the range from 0 to 50% by weight, or a polymer obtained by polymerizing the mixture of monomers. The polymers include, for instance, an acrylonitrile-styrene copolymer (AS resin).

Of the compounds described above, the polyester-based resin and styrene-based rubber-like elastic copolymer resin are preferable for the compatibility with polycarbonate.

(B) Polyester-Based Resin

There is no specific restriction over the polyester resin used in this invention, and various types of polyester resins may be used in the present invention, and the polyester resin obtained by polymerizing bifunctional carboxylic acid with alkylene glycol is preferable.

The bifunctional carboxylic acid which can be used for the purpose described above includes aromatic dicarboxylic acids such as, for instance, telephthalic acid, isotelephthalic acid, naphthalene dicarboxylic acid. Of these compounds, telephthalic acid is preferable, and other bifunctional carboxylic acid may be used together unless the effect of the present invention is spoiled. The other bifunctional carboxylic acids include, for instance, fatty dicarboxylic acids such as oxalic acid, malonic acid, adipic acid, suberic acid, azelaic acid, sebacic acid, decan dicarboxylic acid, and an ester-formable derivative thereof, and a blending ratio of any of the bifunctional carboxylic acid is preferably within 20% against all of the bifunctional carboxylic acids.

There is no specific restriction over the alkylene glycol, and the alkylene glycols which can be used for this purpose include, for instance, ethylene glycol, propylene-1,2-glocyl, propylene-1,3-glycol, buthylene-1,4-glycol, buthylene-2,3-glycol, C2 to C15 fatty diols such as hexane-1,6-glycol-diol, octane-1,8-diol, neopentylglycol, decan-1,10-diol, and polyethylene glycol. Further two or more types of glycol components may be combined in use.

As the polyester resin obtained by polymerizing the bifunctional carboxylic acid with alkylene glycol, polyethylene telephthalate and polybutylene telephtalate are especially preferable.

The aromatic polyester resin can be produced by the ordinary method with or without the presence of a catalyst for polycondensation containing titanium, germanium, and antimony. For instance, polyethylene telephthalate is generally produced by either one of the following two methods.

In the first method, telephthalic acid and ethylene glycol are subjected to esterification to produce a polyethylene telephthalate. The second method comprises a reaction in a first step in which a lower alkyl ester of telephthalic acid such as dimethyl telephthalate and ethylene glycol are reacted to each other through an ester exchange reaction to produce a glycol ester of telephthalic acid and/or a lower polymer thereof, and a reaction in a second step in which the glycol ester and/or the lower polymer thereof are further polymerized to produce a polymer having a higher degree of polymerization, namely the so-called polymerizing reaction.

The aromatic polyester resin may be used as a single body, and also may be combined with other one or more resins in use.

(C) Styrene-Based Rubber-Like Elastic Copolymer Resin

The styrene-based rubber-like elastic copolymer resin can be blended in polycarbonate to improve the molten liquidity thereof, namely the moldability without spoiling the adhesiveness to the material for a window.

The styrene-based rubber-like elastic copolymers, which can be used for the purpose described above, include an ABS resin in which polybutadiene are polymerized with acrylonitrile and styrene, an AES resin in which ethylene propylene rubber is polymerized with acrylonitrile and styrene, an AAS resin in which acrylic rubber is polymerized with acrylonitrile and styrene, and two or more resins can be used together, and further this type of resin may be used as a mixture thereof with a copolymer resin (AS resin) of acrylonitrile and styrene.

A content of rubber in the styrene-based rubber-like elastic copolymer resin should be for instance, in the range from 2 to 60% by weight, preferably in the range from 5 to 40% by weight, and more preferably in the range from 10 to 40% by weight. When a percentage of the rubber is less than 2% by weight, the shock resistance is insufficient, and on the other hand, when the percentage is over 50% by weight, such troubles as decrease of heat stability, decrease of molten liquidity, gelatinization, and coloring may occur. The rubbers, which can be used for the purpose described above, include a rubber-like polymer containing polybutadiene, acrylate and/or methacrylate, styrene-butadiene-styrene (SBS) rubber, styrene-butadiene rubber (SBR), butadiene-acryl rubber, isoprene rubber, isoprene-styrene rubber, isoprene-acryl rubber, and ethylene propylene rubber.

Of these compounds, polybutadiene is especially preferable. As the polybutadiene, either one of lower cis-polybutadiene (for instance, that containing 1,2-vinyl bond by 1 to 30 molar percent and 1,4-cis bond by 30 to 42 molar percent), or higher cis-polybutadiene (for instance, that containing 1,2-vinyl bond by 20 molar percent or less, and 1,4-cis bond by 78 molar percent or more), and also a mixture of these two types of polybutadiene may be used.

Addition of an antioxidant, an amine-based stabilizer such as HALS, or a ultraviolet stabilier based on benzophenon, benzotriazole, and triazine to the rubber component is especially effective, which substantially improves the durability such as heat resistance and light resistance.

(D) Inorganic Filler

An inorganic filler may be blended in the first material to reduce the linear thermal expansion coefficient thereof. The inorganic fillers, which can be used for this purpose, include talc, mica, kaoline, diatomite, calcium carbonate, calcium sulfate, barium sulfate, glass fiber, and carbon fiber. Of these materials, talk and mica, each of which has a plate-like form, are preferable. The plate-like filler such as talc and mica can reduce the linear thermal expansion coefficient without lowering the MD/TD ratio, an index for the anisotropy, even when the addition volume increases.

Talc is a magnesium silicate hydrate, and any of those commercially available may be used for this purpose.

When the blending ratio of the inorganic filler is less than 5%, the effect of reducing the linear thermal expansion coefficient is insufficient to control deformation of a molding. On the other hand, when the blending ratio is over 20%, the shock resistance becomes lower. The average particle diameter of the inorganic filler should be in the range from 0.1 to 50 $\mu$m, preferably in the range from 0.2 to 20 $\mu$m.

In the present invention, such a material as glass fiber may be used as the inorganic filler, but when the blending ratio is less than 5%, the effect of reducing the linear thermal expansion coefficient is insufficient. When the blending ratio is over 20%, the MD/TD ratio falls below 0.6, and in that case, warping will occur in the molded article, and also the trouble that a surface of the molded article becomes rough due to floating of the glass fiber will occur.

Optionally, such materials as potassium titanate fiber or fine fiber like aluminum borate whisker, calcium carbonate, and calcium silicate (wallastonite) may be used as the inorganic filler.

(E) Core-Shell Type Graft Rubber-Like Elastic Body

The core-shell type rubber-like elastic body has a two-layered structure comprising a core and a shell, and the core portion is soft rubber-like, while the shell portion on the core is hard resin-like, and the elastic body itself is a graft rubber-like one in the powder state (or in the granulated state). This core-shell type graft rubber-like elastic body substantially maintains the original granulated state even after it is melted and blended with polycarbonate, so that it is homogenously dispersed in the polycarbonate and can advantageously prevent separation of the surface layer.

Various types of core-shell type graft rubber-like elastic bodies may be used for the purpose described above. As the products commercially available from the market, such products as Hiblen B621 (ZEON Corporation), KM-330 (Rhome and Hass Company), METABLEN W529, METABLEN S2001, Methablen C223, METABLENB621 (Mitsubishi Rayon Co.,Ltd.), and KM 2602, KM 2603 (Kureha Chemical Industry Co., Ltd.) may be used for the purpose described above.

Of these products, for instance, the product obtained by polymerizing one or more vinyl-based monomers in the presence of rubber-like polymer obtained from a monomer containing alkyl acrylate or alkyl methacrylate as the main component is preferable.

As the alkyl acrylate or alkyl methacrylate, that having a C2 to C10 alkyl group is preferable. More specifically, such materials as ethyl acrylate, butyl acrylate, 2-ethylhexyl acrylate, and n-octyl methacrylate may be used for the purpose described above.

The rubber-like polymers obtained by the monomers containing mainly the alkyl acrylate as described above include, for instance, a polymer obtained by polymerizing the alkyl acrylate with other vinyl-based monomer, which can be polymerized therewith, such as, for instance, methyl methacrylate, acrylonitrile, vinyl acetate, and styrene in the weight ratio of 70% or more vs 30% or below.

In this reaction, such a multi-functional monomer as divinyl benzene, ethylene methacrylate, triallyl cyanurate, and triallyl isocyanurate may be added as a bridging agent according to the necessity. Further a mixture with polysiloxane rubber may be used as the rubber-like polymer.

The vinyl-based monomers reacted in the presence of the rubber-like polymer, which can be used for the purpose described above, include, for instance, styrene, aromatic vinyl compounds such as a-methyl styrene, alkyl acrylates such as methyl acrylate and ethyl acrylate, and alkyl methacrylates such as methyl methacrylate and ethyl methacrylate. Any of the monomers may be used singly or may be combined with one or more ones in use, and may also be copolymerized with other vinyl-based polymer such as, for instance, a cyanated vinyl compound like acrylonitrile and methacrylonitrile or a vinyl ester compound like vinyl acetate and vinyl propionate. This polymerizing reaction may be performed by various methods including agglomeration polymerization, suspension polymerization, and emulsification polymerization, and the emulsification polymerization is preferable.

The core-shell type graft rubber-like elastic body should preferably contain the rubber-like polymer described above by 20% or more by weight, and more preferably by 40% or more by weight. More specifically the core-shell type graft rubber-like elastic bodies include an MAS resin elastic body such as a graft copolymer of n-butyl acrylate in the range from 60 to 80% by weight, styrene, and methyl acrylate.

As the graft copolymer, a preferable one is the composite rubber-based graft copolymer having the structure in which the polysiloxane rubber component in the range from 5 to 95% by weight and the polyacrylic (metha)acrylate rubber component in the range from 95 to 5% by weight are so closely intertangled with each other so that they can not be separated from each other, and also in which at least one type of vinyl monomer is graft-polymerized to the composite rubber with the average particle diameter in the range from 0.01 to 1 μm. This composite rubber-based graft copolymer has the higher effect for improving the shock resistance as compared to a graft copolymer comprising one type of rubber. The composite rubber-based graft copolymer is available as a market product with the product name of METABLEN S-2001 or the like from Mitsubishi Rayon Co.,Ltd.

A phosphite-based antioxidant may be blended in the first material according to the present invention. There are various types of phosphite-based antioxidants, and for instance, the compounds expressed by the chemical formula (3) and chemical formula (4) may be used for this purpose.

$$(R6O)3P \tag{3}$$

In the chemical formula (3), R6 indicates an alkyl group having 1 to 20 carbon atoms, an allyl group having 6 to 20 carbon atoms, an alkylallyl group having 7 to 30 carbon atoms, or an allyl alkyl group having 7 to 30 carbon atoms. Each of the hydrocarbon groups may have a halogen atom, an alkyl-tio group having 1 to 30 carbon atoms or a hydroxyl group. Further the three R6s in the chemical formula (3) may be identical or different from each other respectively, and any R6 is not hydrogen.

The phosphite compounds expressed by the chemical formula (3) include, for instance, tris (mixed mono- and di-nonylphenyl) phosphite, tris-nonylphenyl phosphite, tris (2,4-di-t-butylphenyl) phosphite, triphenyl phosphite, diphenyl-mono (2-ethylhexyl) phosphite.

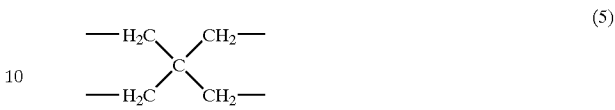

(4)

In the chemical formula (4), R7 and R8 indicate a hydrogen atom, an alkyl group having 1 to 20 carbon atoms, an allyl group having 6 to 20 carbon atoms, an alkylallyl group having 7 to 20 carbon atoms, or an allyl alkyl group having 7 to 20 carbon atoms. These hydrocarbon groups may have a halogen atom, an alkyl-tio group having 1 to 30 carbon atoms, or a hydroxy group. R7 and R8 may be different from each other, but either one is not a hydrogen atom. Z indicates a quadrivalent hydrocarbon residue having 1 to 20 carbon atoms including or not including an ether bond.

The phosphite compounds expressed by the chemical formula (4) include, for instance, bis (2,4-di-t-butylphenyl) pentaerythritol diphosphite, bis (2,6-di-t-butyl4-methylphenyl) pentaerythritol diphosphite, and distearyl pentaerythritol diphosphite.

Of the compounds expressed by the chemical formula (4), the phosphite compound in which Z is of the pentaerythritol type expressed by the following chemical formula (5) is preferable.

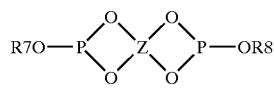

(5)

Each of the phosphite compounds described above may be used singly or combined with other one or more compounds in use.

Further in the present invention, a surface of the molded article should preferably be coated with a hard coat to prevent the molded article from being damaged.

There is no specific restriction over the hard-coating agent, and any of those based on silicone, acryl, or silazane may be used. Of these compounds, the two-coat type of hard coating in which a primer layer is provided before the hard coating agent is applied to improve the adhesiveness or weather resistance is preferable. Further there is not specific restriction over the coating method, and any of spray coating, dip coating, flow coating, spin coating, bar coating or the like may be used for this purpose. An acrylic coating may be applied to a rear surface of the molded article to prevent the molded article from being fogged or damaged.

The hard-coating method which can be employed in the present invention is not limited to application of a hard-coating agent, and such coating methods as inserting a film or application of a chemical agent suited to a transcription film for transcription.

In the present invention, a resin composition used in the first material may be prepared by blending other various types of necessary additional components therein, melting and kneading the mixture. Any devices and methods conventionally used such as a ribbon blender, a Henschel mixer, a Banbury mixer, a drum tumbler, a single-spindle screw extruder, a two-spindle screw extruder, a co-kneader, and a multi-spindle screw extruder may be employed for this blending and kneading operations. The heating temperature during kneading is set to the range from 240 to 300° C. according to a type of the resin mixed therein.

With the present invention, the transparent section and the frame section may be formed simultaneously in the integrated state, which enables cost reduction.

As the linear thermal expansion coefficient of the first material in the MD direction is lower than that of the second material, even when the transparent section tries to deform itself due to change in the temperature, the frame section inhibits deformation of the transparent section. Further, as the anisotropy of the first material is reduced, deformation of the transparent section can be restricted regardless of the direction in which direction the resin flows during molding. Therefore, the transparent section does not substantially warp nor does the visibility drop, so that a high quality molded article can be obtained.

DETAILED DESCRIPTION OF PREFERRED EMBODIMENT(S)

Embodiments of the present invention are described below with reference to the drawings.

Figure 1:
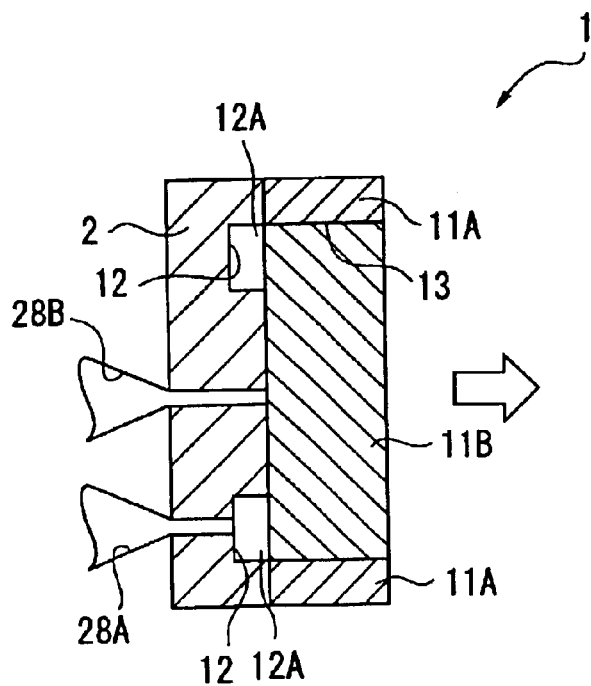
FIG. 1 is a cross-sectional view showing an injection molding machine used in a molding method according to one embodiment of the present invention.
Figure 2:
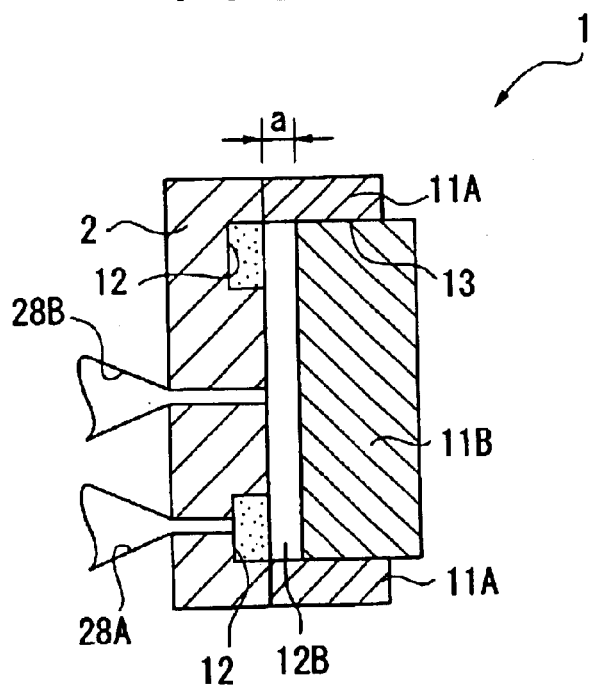
FIG. 2 is a cross-sectional view illustrating operations of the injection molding machine according to the embodiment above.

FIG. 1 is a cross-sectional view showing an injection molding machine which is employed in the molding method according to one embodiment of the present invention.

The injection molding machine 1 comprises a cavity 2 fixed to a fixed die plate not shown, movable blocks 11A, 11B which are provided on a movable die plate not shown and can move to or away from the cavity 2.

Figure 3:
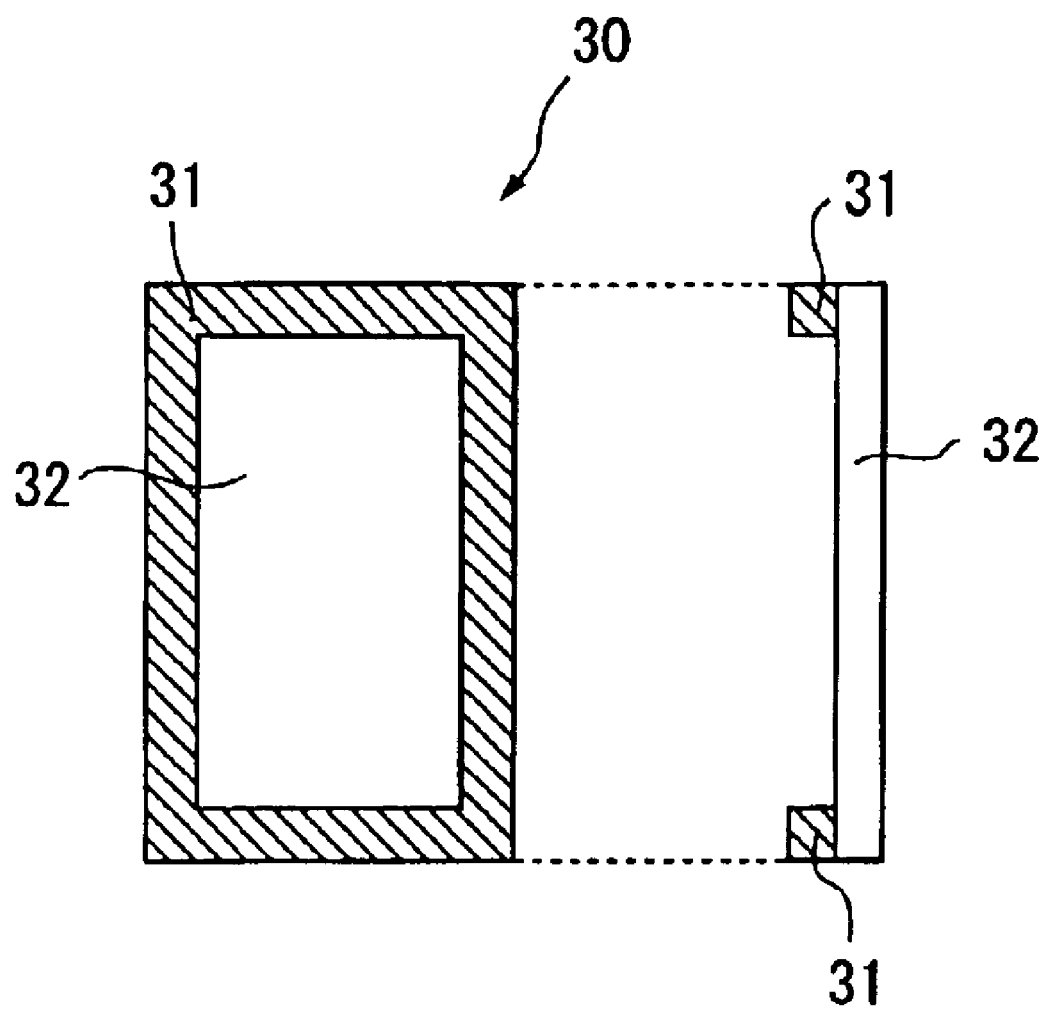
FIG. 3 is a view showing a flat view and a cross section of a window comprising a two-color molded article according to the embodiment.

The cavity 2 and the two movable blocks 11A, 11B are dies for forming a window 30 of a car as shown in FIG. 3. The window 30 of a car comprises a substantially square and flat transparent section 32, and a frame section 31 formed in the integrated state in an external periphery section on either one of the top and rear surfaces of the transparent section 32.

An annular-shaped recessed section 12 which has square profile viewed in injecting direction is formed in the cavity 2.

A through-hole 13 is formed at a center of the movable block 11A, and the movable block 11B can be inserted into and set in this through-hole 13.

Connected to the cavity 2 are injection nozzles of an injection machine 28A for injecting the first material and an injection machine 28B for injecting the second material.

With the injection molding machine 1, by controlling a cylinder not shown, it is possible to move the movable block 11A and movable block 11B to and away from the cavity 2 discretely.

There is not specific restriction over the operation for driving the movable blocks 11A and 11B, and various methods may be employed for this purpose. For instance, the direct pressure method in which the movable blocks 11A, 11B are directly driven by an hydraulic cylinder, and the wedge method in which the movable blocks 11A, 11B are driven by moving a wedge-formed plate to and away from the cavity 2 with a hydraulic cylinder may be employed for this purpose.

Operations of the injection molding machine 1 according to this embodiment are described below.

At first, the movable blocks 11A and 11B are moved forward, whereby the cavity 2 is completely closed with the movable blocks 11A and 11B. With this operation, as shown in FIG. 1, the first material injection space 12A for forming a frame section 31 is formed between the movable block 11B and the recessed section 12 of the cavity 2. Then, the melted first material is injected from the injection machine 28A into the first material injection space 12A.

When a prespecified period of time has passed after the injection of the melted resin from the injection machine 28A is finished, namely when shrinkage of the injected first material proceeds and the shrinkage rate by the remaining shrinking amount of the molding shrinkage amount has been equalized to the molding shrinkage rate of the second material, the movable block 11B is moved backward by a prespecified range a. With this operation, a second material injection space 12B for forming the transparent section 32 is formed. Then the melted second material is injected from the injection machine 28B into the second material injection space 12B.

With the configuration as described above, the following advantages are provided.

(1) As the transparent section 32 and the frame section 31 can be formed simultaneously in the integrated state, so that the production cost can be reduced.

(2) As the linear thermal expansion coefficient of the first material is set to a value lower than that of the second material, even when the transparent section tries to deform itself due to change in temperature, the frame section 31 restricts deformation of the transparent section 32. Further, as the anisotropy of the first material is reduced, so that the frame section 31 restricts the deformation of the transparent section 32 regardless of the direction in which the resin flows during molding. Therefore, the transparent section does not substantially warp nor does the visibility drop, so that a high quality molded article can be obtained.

The embodiment of the present invention is based on the configuration as described above.

[Conditions for Molding]

1. Die

A die for laminate molding capable of molding a transparent section with the size of 250 mm×120 mm×4 mm and a frame section surrounding the transparent section with the width of 20 mm was used.

2. Molding Method

Injection molding was carried out by first injecting the first material to form a frame section and then injecting the second material to form a transparent section. In this step, the cylinder temperature was changed according to viscosity of the material, and the temperature for injection of the first material was set to the range from about 240 to 300° C., and the temperature for injection of the second material was set to 290° C. The wedge method was employed for driving the movable blocks 11A and 11B.

[Method for Measuring the Linear Thermal Expansion Coefficient]

A piece with the size of 5 mm×15 mm was cut out from a central portion of a flat plate-like molded article with the size of 150 mm×150 mm×3 mm, and the piece was used as a testing piece. The testing piece was measured according to the JISK 7197. The range of temperature measurement was set to the range from −30 to 80° C. The linear thermal expansion coefficient in the direction in which the resin flowed when viewed from the gate was defined as MD, while that in the direction crossing the flow of the resin was defined as TD.

For eliminating the difference in the states of the two types of materials just after the molding was finished, temperature of the resin was set to a level suited to each of the materials, and further the same injection speed (50%) was employed for injecting the materials to maintain the pressurizing conditions unchanged, and the minimum pressure Pmin was measured at the point of time when the test piece was fully filled. The injection pressure P was set to 1.2×Pmin with the dwell pressure application set to 0.7×P.

[Method for Measuring Dimensions of the Molded Article]

The frame section of the molded article formed with the die described above was fixed with an urethane-based adhesive to a tool made from aluminum, and was left for 48 to 72 hours until the urethane-based adhesive was fully solidified. Then, the lines were drawn in the lattice form at 7.5 mm intervals in the direction along the short edge and also at 15 mm intervals in the direction along the long edge, and displacement in vertical direction at each of the cross points of the lattice lines was measured at 23° C. and at 80° C. When measurement was performed at 80° C., a measurement device portion of the sizer was immersed in a constant temperature bath.

The dimensional difference between the displacement in vertical at 23° C. and the displacement at 80° C. was measured, and displacement of Comparative Example 1 was defined as the maximum displacement index of 100, which was used as the reference value. Therefore, in the comparative examples and in the examples, the smaller the maximum displacement index of each sample, the smaller the defromation of each sample is.

A result of testing in Comparative Examples 1 to 3 and Examples 1 to 3 is as shown in the table below.

EXAMPLE 1

60 weight % polycarbonate, 25 weight % PET resin, 10 weight % talc 1 as an inorganic filler, and 5 weight % rubber-like elastic body 2, 100 weight % in all, were mixed together to prepare the first material, and then 0.5 weight % antioxidant (PEP-36 produced by Asahi Denka Co., Ltd.) was added to the resultant mixture, and the composition was melted and kneaded at the cylinder temperature of 260° C., and was injection-molded at the cylinder temperature of 270° C. The two-spindle extruder TEM35 produced by Toshiba Machine Co., Ltd. was used as a molding machine.

|  |  | Comparative Example 1 | Comparative Example 2 | Example 1 | Example 2 | Example 3 | Comparative Example 3 |
|---|---|---|---|---|---|---|---|
|  | Polycarbonate | 100 | 50 | 65 | 40 | 50 | 40 |
|  | ABS resin |  | 50 |  |  |  |  |
|  | PET resin |  |  | 25 |  | 40 | 40 |
|  | PBT resin |  |  |  | 30 |  |  |
|  | Rubber-like elastic body 1 |  |  |  | 10 |  |  |
|  | Rubber-like elastic body 2 |  |  | 5 |  |  |  |
|  | Talc 1 |  |  | 10 |  |  |  |
|  | Talc 2 |  |  |  | 20 |  |  |
|  | Glass fiber |  |  |  |  | 10 | 20 |
| Linear thermal expansion coefficient of the first material (frame section) ($\times 10^{-5}$ (1/K)) | MD direction | 6.5 | 6.7 | 5.5 | 4.8 | 5.0 | 3.0 |
|  | TD direction | 6.5 | 7.0 | 6.0 | 5.5 | 6.3 | 6.8 |
|  | MD/TD ratio | 1.0 | 0.9571 | 0.9167 | 0.8728 | 0.7937 | 0.4412 |
|  | Changes in | — | +0.2 | −1.0 | −1.7 | −1.5 | −3.5 |
| Molded article | Warp | ○ | ○ | ○ | ○ | ○ | × |
|  | Max. displacement index | 100 | 108 | 64 | 60 | 56 | — |

The following materials were used as materials for molding.
Polycarbonate: A1900 produced by Idemitsu Petrochemical Co., LTD.,
ABS resin: AT-05 produced by NIPPON A & L INC.
PET resin (polyethylene resin): MA523VXD25 produced by Mitsubishi Rayon Co., Ltd.
PBT resin (polybutylene resin): N1000 produced by Mitsubishi Rayon Co., Ltd.
Core-shell type graft rubber-like elastic body 1: S2001 silicone-based core-shell elastomer produced by Mitsubishi Rayon Co., Ltd.
Core-shell type graft rubber-like elastic body 2: EXL 2602 MBS produced by Kureha Chemical Industry Co., LTD.
Talc 1: FFR produced by Asada Seihun
Talc 2: JM 156 produced Asada Seihun
Glass fiber: CS03MA 409C with the average particle diameter of 13 μm produced by ASAHI FIBER GLASS Co.

COMPARATIVE EXAMPLE 1

Black-colored polycarbonate as the first material was injection-molded at the cylinder temperature of 290° C., and also transparent polycarbonate as the second material was injection-molded at the cylinder temperature of 290° C. As an injection molding machine, the two-cylinder injection molding machine produced by Japan Steel Works, Ltd. with the product name of J450EII-2M was used.

The obtained molded article was fixed with an adhesive to a tool made from aluminum with the width of 10 mm along the external periphery thereof, and was left for 48 hours to harden the adhesive.

COMPARATIVE EXAMPLE 2

50 weight % polycarbonate and 50 weight % ABS resin were mixed together, 100% by weight in all, to prepare the first material, and an antioxidant (PEP-36 produced by Asahi Denka Co., Ltd.) was added by 0.1 weight % to the mixture, and the resultant composition was melted and kneaded at the cylinder temperature of 250° C., and was injection-molded at the cylinder temperature of 260° C. The two-spindle extruder TEM35 produced by Toshiba Machine Co., Ltd. was used as a molding machine. Other conditions were the same as those employed in the Comparative Example 1.

Other conditions were the same as those employed in the Comparative Example 1.

EXAMPLE 2

40 weight % polycarbonate, 30 weight % PBT resin, 20 weight % talc 2 as a inorganic filler, and 10 weight % rubber-like elastic body 1 were mixed together, 100 weight % in all, to prepare the first material, and further an antioxidant (PEP-36 produced by Asahi Denka Co., Ltd.) was added thereto by 0.5 weight %, and the obtained composition was melted and kneaded at the cylinder temperature of 260° C. and was injected-molded at the cylinder temperature of 270° C. The two-spindle extruder TEM35 produced by Toshiba Machine Co., Ltd. was used as a molding machine. Other conditions were the same as those employed in the Comparative Example 1.

EXAMPLE 3

50 weight % polycarbonate, 40 weight % PET resin, 10 weight % glass fiber as an inorganic filler, 100 weight % in all, were mixed to prepare the first material, and further an antioxidant (PEP-36 produced by Asahi Denka Co., Ltd) was added by 0.5 weight % thereto, and the resultant composition was melted and kneaded at the cylinder temperature of 260° C. and was injected-molded at the cylinder temperature of 270° C. The two-spindle extruder TEM35 produced by Toshiba Machine Co., Ltd. was used as a molding machine. Other conditions were the same as those employed in the Comparative Example 1.

COMPARATIVE EXAMPLE 3

40 weight % of polycarbonate, 40 weight % PET resin, 20 weight % glass fiber as an inorganic filler, 100 weight % in all, were mixed together to prepare the first material, and further an antioxidant (PEP-36 produced by Asahi Denka Co., Ltd) was added by 0.5 weight % thereto, and the resultant composition was melted and kneaded at the cylinder temperature of 260° C. and was injected-molded at the cylinder temperature of 270° C. The two-spindle extruder TEM35 produced by Toshiba Machine Co., Ltd. was used as a molding machine. Other conditions were the same as those employed in the Comparative Example 1.

[Assessment]

When it is assumed that the maximum displacement index in the Comparative Example 1 is 100, the maximum displacement indexes in Examples 1 to 3 are within the range from 56 to 64, which indicates that deformation of the molded article was substantially inhibited. On the other hand, in the Comparative Example 2, the linear thermal expansion coefficients of the first material both in the MD direction and in the TD direction are greater as compared to those in Comparative Example 1, and therefore also the maximum displacement index is greater than that in Comparative Example 1.

In Comparative Example 3, the linear thermal expansion coefficient of the first material in the TD direction is raised, and the linear thermal expansion coefficient ratio of MD/TD ratio is 0.4 indicating the high anisotropy. This molded article largely warps during molding, and can not be fixed to a tool, so that the displacement can not be measured.

The present invention is not limited to the embodiment described above, and various changes and modifications are included within the scope of the present invention as long as the objects of the present invention can be achieved.

What is claimed is:

1. A two-color molding comprising a transparent section and a frame section integrated with the transparent section, wherein said frame section and said transparent section are formed with a first material and a second material respectively, and said first material is a thermoplastic resin with the linear thermal expansion coefficient in a MD direction lower by $1\times10^{-5}$ to $3\times10^{-5}$ (mm/(mm.K)) than that of said second material, and also with a MD/TD ratio for the linear thermal expansion coefficient in the range from 0.6 to 1.

2. The two-color molding according to claim 1, wherein said first material comprises polycarbonate in the range from 40 to 90% by weight, a polyester-based resin and/or a styrene-based rubber-like elastic body copolymer resin in the range from 10 to 60% by weight, an inorganic filler in the range from 5 to 20% by weight, and core-shell type graft rubber-like elastic body in the range from 0 to 20% by weight, 100% by weight in all, and said second material is polycarbonate.

3. The two-color molding according to claim 1, wherein said first material comprises polycarbonate in the range from 50 to 90% by weight, a polyester-based resin in the range from 10 to 40 weight %, an inorganic filler in the range from 5 to 20% by weight, and core-shell type graft rubber-like elastic body in the range from 0 to 20% by weight, 100% by weight in all, and said second material is polycarbonate.

4. The two-color molding according to claim 1, wherein said first material comprises polycarbonate in the range from 40 to 90% by weight, a styrene-based rubber-like elastic body copolymer resin in the range from 10 to 60 weight %, an inorganic filler in the range from 5 to 20% by weight, and core-shell type graft rubber-like elastic body in the range from 0 to 20% by weight, 100% by weight in all, and said second material is polycarbonate.

5. The two-color molding according to claim 2, wherein said inorganic filler is talc.

6. The two-color molding according to claim 2, wherein said inorganic filler is glass fiber and is contained in said first material in the range from 5 to 15% by weight.

7. A window for a car, wherein said window is formed with the two-color molding according to claim 1.

8. A method for molding the two-color molding according to claim 1, said method comprising the steps of:

injecting said first material into a cavity to form said frame section, and injecting said second material into the cavity to form said transparent section.

* * * * *